US012521860B2

(12) United States Patent
Xu

(10) Patent No.: US 12,521,860 B2
(45) Date of Patent: Jan. 13, 2026

(54) STRIKER DRIVING MECHANISM FOR ELECTRIC NAIL GUN

(71) Applicant: YUEQING ZHONGCHUANG TOOLS CO., LTD, Wenzhou (CN)

(72) Inventor: Ruobao Xu, Wenzhou (CN)

(73) Assignee: YUEQING ZHONGCHUANG TOOLS CO., LTD, Wenzhou (CN)

( * ) Notice: Subject to any disclaimer, the term of this patent is extended or adjusted under 35 U.S.C. 154(b) by 0 days.

(21) Appl. No.: 19/260,200

(22) Filed: Jul. 3, 2025

(65) Prior Publication Data

US 2025/0332702 A1 Oct. 30, 2025

Related U.S. Application Data

(63) Continuation of application No. PCT/CN2023/140802, filed on Dec. 22, 2023.

(30) Foreign Application Priority Data

Jan. 13, 2023 (CN) ......................... 202310093430.1

(51) Int. Cl.
*B25C 1/06* (2006.01)
*B25C 1/00* (2006.01)
*B25C 1/04* (2006.01)

(52) U.S. Cl.
CPC ................ *B25C 1/06* (2013.01); *B25C 1/001* (2013.01); *B25C 1/047* (2013.01)

(58) Field of Classification Search
CPC ........... B25C 1/06; B25C 1/001; B25C 1/047; B25C 1/041; B25C 1/00; B25C 1/04; B25C 1/043; B25C 1/045
See application file for complete search history.

(56) References Cited

U.S. PATENT DOCUMENTS 5,941,441 A 8/1999 Ilagan
2008/0073403 A1 3/2008 Cho et al.
2024/0033889 A1* 2/2024 Yan .......................... B25C 1/06

FOREIGN PATENT DOCUMENTS

CN 211729042 U 10/2020
CN 114851134 A 8/2022
(Continued)

OTHER PUBLICATIONS

International Search Report issued in corresponding PCT Application No. PCT/CN2023/140802, dated Mar. 8, 2024.
(Continued)

*Primary Examiner* — Veronica Martin
(74) *Attorney, Agent, or Firm* — Westbridge IP LLC

(57) ABSTRACT

A striker driving mechanism for an electric nail gun includes a striker, a driving motor, a gearbox, a driving cam and a relay device. The striker has driving teeth on one side facing the driving cam to engage with pins thereon. A nail driving groove with a locking hole is centrally located on the top surface of the front of the striker. A triangular projection is provided on the striker bottom and in front of the locking hole. The relay device includes a mounting base hinged with one end of a striker support block whose other free end has an arc-shaped latch projection facing upward and connecting a reset spring being pre-compressed to maintain the arc-shaped latch projection always held against the bottom of the striker. The striker having single side tooth structure and a passive catch device simplifies the structure and improves the operational stability.

18 Claims, 5 Drawing Sheets

(56) References Cited

FOREIGN PATENT DOCUMENTS

| | | | |
|---|---|---|---|
| CN | 116061135 | A | 5/2023 |
| CN | 219543059 | U | 8/2023 |

OTHER PUBLICATIONS

Written Opinion issued in corresponding PCT Application No. PCT/CN2023/140802, dated Mar. 8, 2024.

* cited by examiner

STRIKER DRIVING MECHANISM FOR ELECTRIC NAIL GUN

CROSS-REFERENCE TO RELATED APPLICATIONS

This application is a continuation of International Application No. PCT/CN2023/140802, filed on Dec. 22, 2023, which claims priority to Chinese Patent Application No. 202310093430.1, filed on Jan. 13, 2023. The disclosures of the above-mentioned applications are hereby incorporated by reference in their entireties.

TECHNICAL FIELD

The present application relates to an electric nail gun, and specifically to a striker driving mechanism for an electric nail gun.

BACKGROUND

In recent years, an electric nail gun has wide popularity as it does not require high-pressure gas source for working and is more convenient and widely applicable than a pneumatic nail gun.

The existing electric nail gun mainly includes a gun body, an energy accumulator mechanism, a striker driving mechanism and a nail magazine mechanism. The energy accumulator mechanism is set at the top rear of the gun body, the striker driving mechanism is set in the middle of the gun body, and the nail magazine mechanism is set at the front end of the gun body.

The sealed internal space in the aforementioned energy accumulator mechanism is filled with inert gas with a pre-pressure. The striker driving mechanism mainly includes a striker, a driving motor, a gearbox, a driving cam, a Hall sensing element for detecting the rotational position of the driving cam, a relay device located on the opposite side of the driving cam and on the other side of the striker, and a striker middle part sliding guide block located on the top or bottom surface of the striker. The nail magazine mechanism which functions as storing, feeding and discharging nails, has a nail outlet, a sliding guide projection at the front of the striker, and a nail channel. During operation the nail magazine mechanism feeds the stored nails one by one into the nail channel. The rear end of the striker extends into the energy accumulator mechanism and is movably hinged with the piston of the energy accumulator mechanism to maintain linkage therebetween. The middle portion of the striker slides back and forth along the striker middle sliding guide block provided on the top or bottom surface of the striker. The front end of the striker extends into the magazine mechanism and slides back and forth along a sliding guide projection in the magazine mechanism. After assembly, the centerline of the energy accumulator mechanism, the centerline of the striker and the nail channel in the nail magazine mechanism are in a linear layout.

During operation, the driving cam is driven by the driving motor through the gearbox, which drives the striker back towards the energy accumulator mechanism to reset, and at the same time compresses the sealed inert gas in the energy accumulator mechanism, enabling energy accumulation. After the energy accumulation is completed, the driving cam separates from the striker. Then, the striker is quickly ejected forward by the explosive force of the compressed gas expansion in the energy accumulator mechanism, strikes the nails that have been delivered to the nail channel of the nail magazine mechanism, and ejects the nails from the nail channel to complete the nail striking operation.

The striker in the above structure has a double-sided tooth structure with a driving cam and a relay device provided in respective sides. The striker is provided with driving teeth on the side facing the driving cam. These driving teeth engage with a number of pins spaced apart on the driving cam. During operation, the striker is driven to move backward and reset to the maximum energy accumulation position at the rear end from the front end where the nailing operation is terminated by means of the meshing transmission between pins on the driving cam and the driving teeth. In practice, in order to obtain better energy accumulation effect, one complete process of backward movement and resetting of the striker for engage accumulation normally requires the driving cam to be driven to complete two rotations. Therefore, relay teeth are provided on the other side of the striker facing the relay device. When the driving cam completes one rotation, the pin of the driving cam will separate from the driving teeth. At this point, the relay device needs to extend relay claws to engage with and stop the relay teeth of the striker, in order to maintain the position of the striker, and to avoid the striker that has not completed the energy accumulation being ejected. When the pin of the driving cam rotates to engage with the driving teeth again, the relay claws of the relay device retract at the same time to ensure that the striker continues to move backward and reset to store energy.

In the above structure, the relay device is an active mechanism with a complex structure and action, and the extension and retraction of its relay claws is controlled by a Hall sensing element set near the driving cam. During operation, the Hall sensing element detects the rotation angle of the driving cam in real time. Upon detecting the driving cam having completed one rotation and the pin on the cam being about to separate from the driving teeth, a signal is issued to indicate the relay device extending the relay claw to engage with and stop the relay teeth of striker. When the pin of the driving cam engages with the driving teeth of the striker again after the driving cam continues to rotate by a certain angle, the relay device retracts the relay claws so as to separate from the relay teeth of the striker.

Long-term use has revealed that there exists a certain error in the detection accuracy of rotation position of the driving cam by the Hall sensing element. The signal issued too early or too late will lead to the relay claw of the relay device extending too early or too late, thus rendering relay failure, and ultimately affecting the normal operation of the nail gun.

SUMMARY

To solve the above problems, a striker driving mechanism for an electric nail gun is designed according to the present application, wherein the striker driving mechanism has a striker with a single-sided tooth structure and has a passive relay device, which not only simplifies the structure, but also improves the operational stability of the nail gun.

In order to achieve the above objectives, the following technical solutions are provided according to the present application.

A striker driving mechanism for an electric nail gun includes a striker, a driving motor, a gearbox, a driving cam and a relay device; a rear end of the striker extends into an energy accumulator mechanism of the nail gun and is movably hinged with a piston in the energy accumulator mechanism to maintain linkage therebetween; a front end of the striker extends into a nail magazine mechanism of the nail gun; and the driving motor drives the driving cam to rotate through the gearbox, wherein the striker is provided with driving teeth only on a side facing the driving cam; the driving teeth mesh with a number of pins on the driving cam; the rotation of the driving cam drives the striker to move back to reset for energy accumulation; a nail driving groove is located at the center of the front part of the top surface of the striker and extends from the front end to the middle part of the striker; a locking hole running through the top and bottom surfaces of the striker is provided at the end of the nail driving groove; a triangular projection is provided on the bottom surface of the striker and in front of the locking hole; and the relay device is provided between the striker driving mechanism and the energy accumulator mechanism, wherein the relay device includes a mounting base with a striker support block positioned directly opposite the central axis of the striker, one end of which is hinged with the mounting base and the other free end of which has an arc-shaped latch projection facing upward and connecting a reset spring at the bottom thereof; the reset spring is pre-compressed to enable the arc-shaped latch projection to maintain a tendency to pivot towards the upward direction and to be held against the bottom of the striker; and during the course of backward movement for resetting of the striker, when the driving cam completes one rotation and the pin thereon just separates from the driving teeth, the arc-shaped latch projection just enters the locking hole of the striker.

The slope of the front side of the arc-shaped latch projection is less than the slope of the rear side, while the slope of the front side of the triangular projection is also less than the rear side. After the arc-shaped latch projection enters the locking hole, the rear side of the arc-shaped latch projection is held against the rear side of the locking hole to prevent the forward movement of the striker. When the striker continues to move backward, the sliding between the apex edge of the triangular projection and the gently sloping front side of the arc-shaped latch projection forces the arc-shaped latch projection to pivot reversely and quickly separate from the locking hole.

A linear sliding groove which is parallel to the nail driving groove is provided in the middle part of the other side of the top surface of the striker which is opposite to the driving teeth. A striker middle part sliding guide block which is parallel to the nail driving groove of the striker is provided on and fixed to the mounting base by means of a connecting arm. The linear sliding groove of the striker slides back and forth along the striker middle part sliding guide block on the mounting base.

A nail magazine mechanism includes an upper shell, a lower shell, and a nail clip configured to store and feed a nail. A nail channel having guiding projections on both sides is centrally located on the bottom of the upper shell. The centerline of the energy accumulator mechanism, the centerline of the striker, and the nail channel in the nail magazine mechanism are coaxially aligned in a line. A nail outlet is provided in the middle part of the lower shell, running through the upper and lower surfaces thereof and connecting with the nail clip located below the lower shell.

The nail driving groove at the front part of the striker slides back and forth along the guiding projections on both sides of the nail channel centered on the bottom surface of the upper shell of the nail magazine mechanism.

The sealed space of the energy accumulator mechanism is filled with an inert gas with a certain pre-pressure.

The start-stop operation of the driving motor is controlled by a trigger on the gun body and a controller inside the gun body. When the trigger is pressed, the driving motor starts to work. The stopping of the driving motor is delay-controlled by the controller. The controller can detect the working current of the driving motor in real time, and compare the detected current signal with a reference current value stored internally. Once the detected current signal exceeds the reference current value, the power supply of the driving motor is immediately cut off, thereby stopping the driving motor.

The reference current value is less than the maximum current value during the operation of the driving motor.

The arc-shaped latch projection on the striker support block of the relay device is always passively tightened against the bottom of the striker by the reset force of reset spring. In the course of nailing, the striker at the maximum energy accumulation position is rapidly ejected to hit a nail by the expansion force of the compressed gas in the energy accumulator mechanism. Due to the presence of the triangular projection in front of the locking hole, the arc-shaped latch projection first crosses over the triangular protrusion, and then directly crosses over the locking hole due to inertia, ensuring a smooth ejection of the striker without obstruction. In the reset course of the striker from the nailing termination position to the maximum energy accumulation position, when the driving cam completes one rotation and the pin of the driving cam just separates from the driving teeth, the arc-shaped latch projection just enters into the locking hole of the striker to prevent the forward movement of the striker to avoid the ejection of the striker on the halfway of resetting. When the pin of the driving cam rotates to engage with the driving teeth again, the striker is driven to continue to move back, and the sliding between the apex edge of the triangular projection and the gently sloping front side of the arc-shaped latch projection forces the arc-shaped latch projection to pivot reversely so as to quickly separate from the locking hole, ensuring that the striker smoothly moves back for resetting.

The relay mechanism including the striker support block and the reset spring in the above structure is a passive relay device, the arc-shaped latch projection of which is always tightened against the striker during the whole operation process thereof, thus no detection and control are needed. By means of the coordination of the arc-shaped latch projection with the bottom surface, the locking hole, and triangular projection of the striker, the smooth ejection of the striker without obstruction as well as the intermediate relay in the resetting course can be ensured. The striker driving mechanism has a simplified structure and stable working performance.

DETAILED DESCRIPTION OF THE EMBODIMENTS

Figure 1:
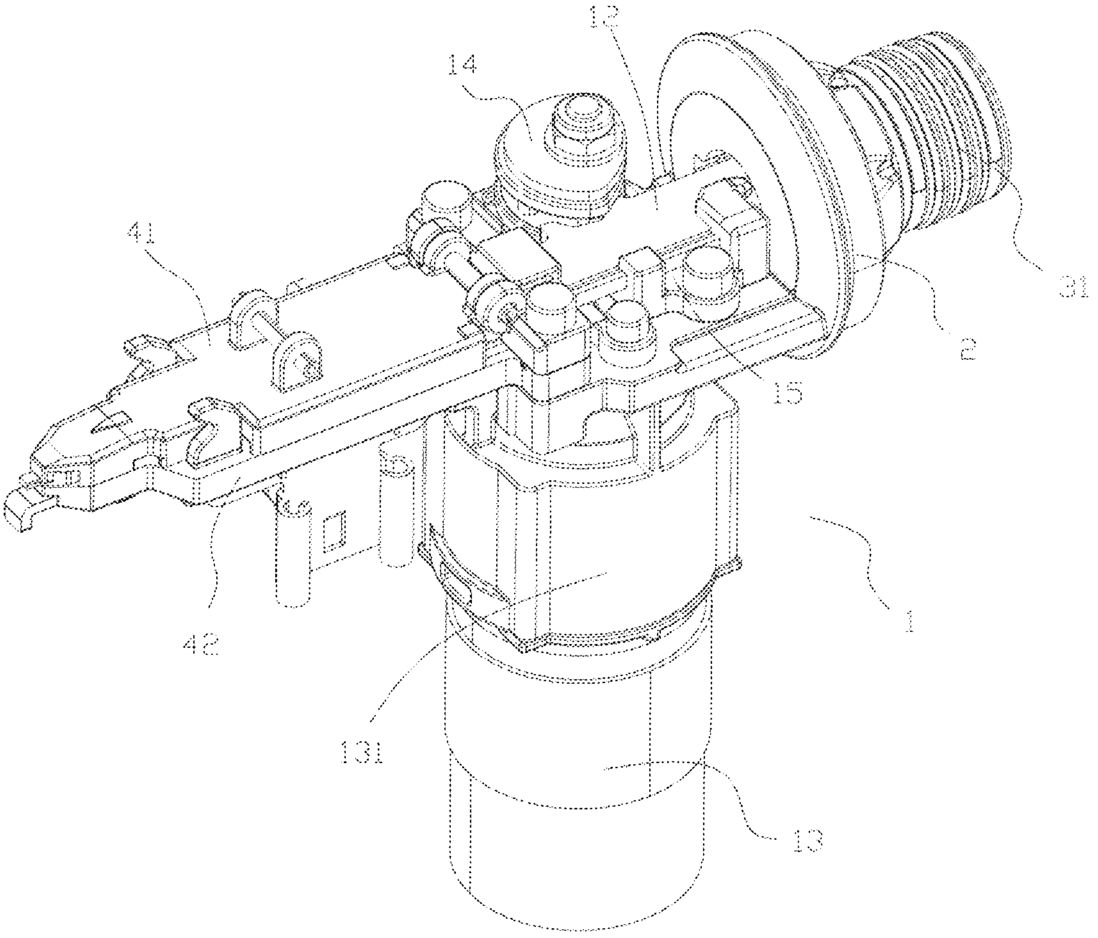
FIG. 1 shows a schematic perspective view of the present application.
Figure 2:
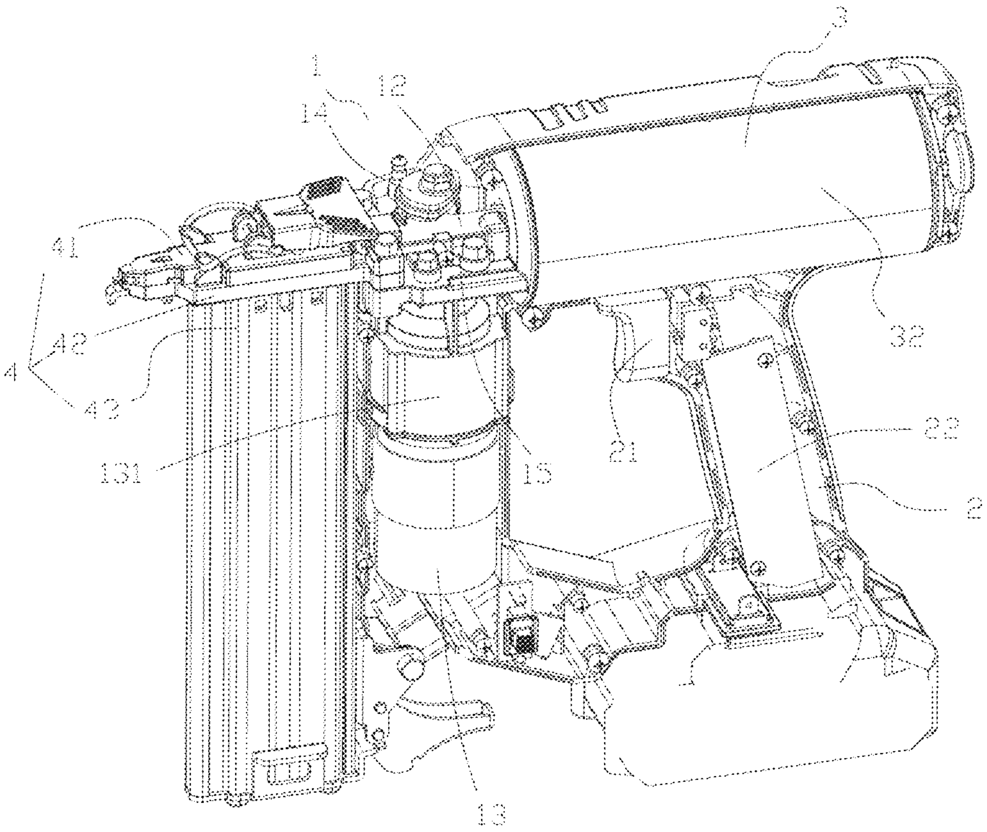
FIG. 2 shows a perspective view of the present application assembled in a nail gun.
Figure 3:
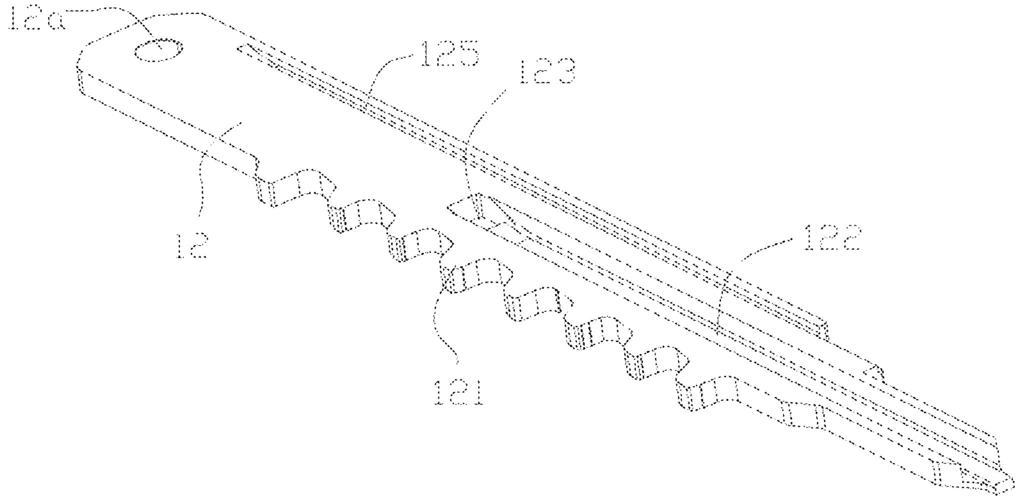
FIG. 3 shows a schematic perspective view of a striker according to the present application.
Figure 4:
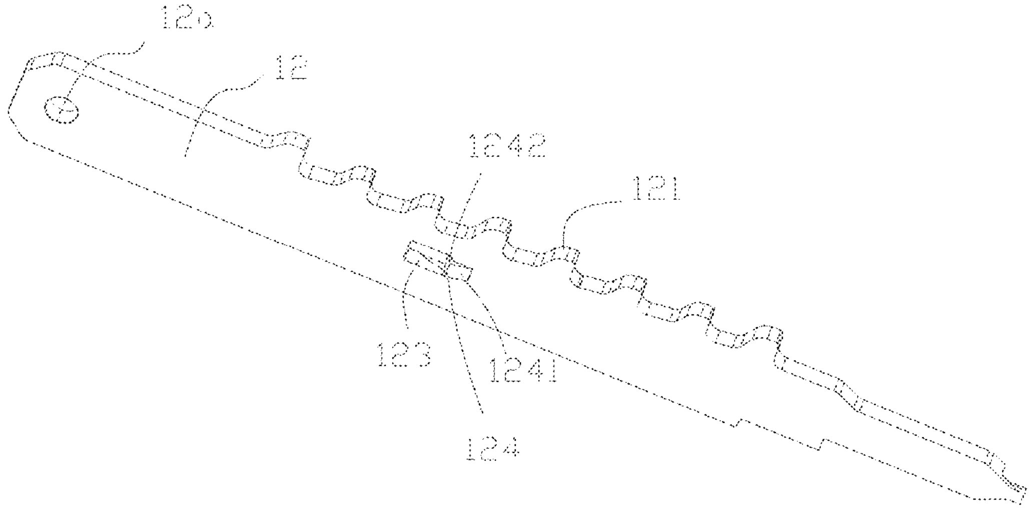
FIG. 4 shows a schematic perspective view of a striker according to the present application taken from another view.
Figure 5:
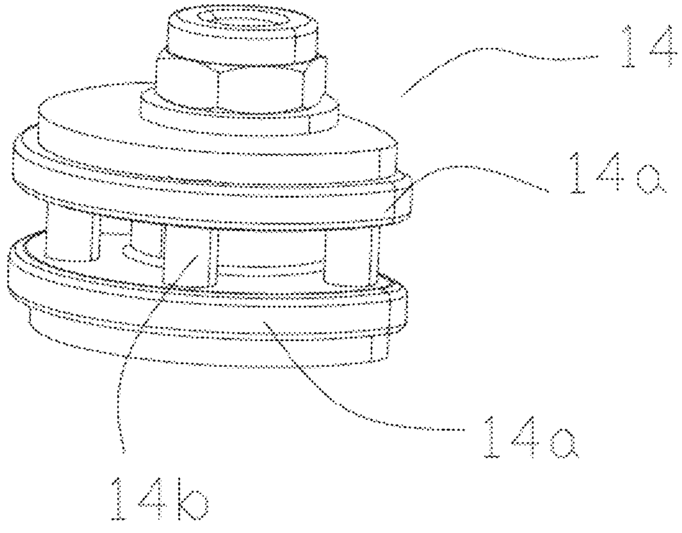
FIG. 5 shows a schematic perspective view of a driving cam according to the present application.
Figure 6:
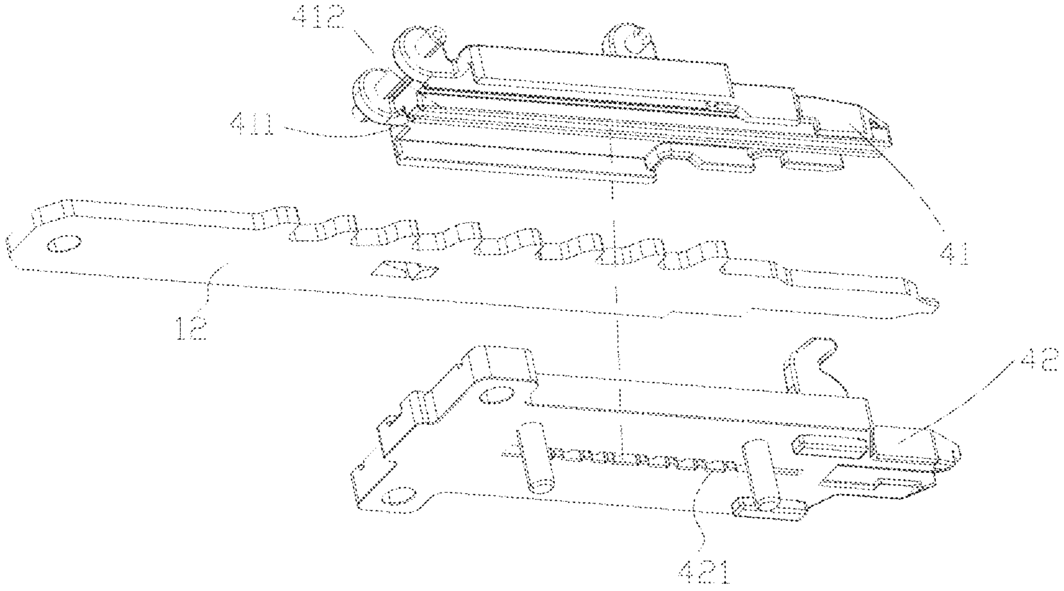
FIG. 6 shows an exploded perspective view of a nail magazine mechanism according to the present application.
Figure 7:
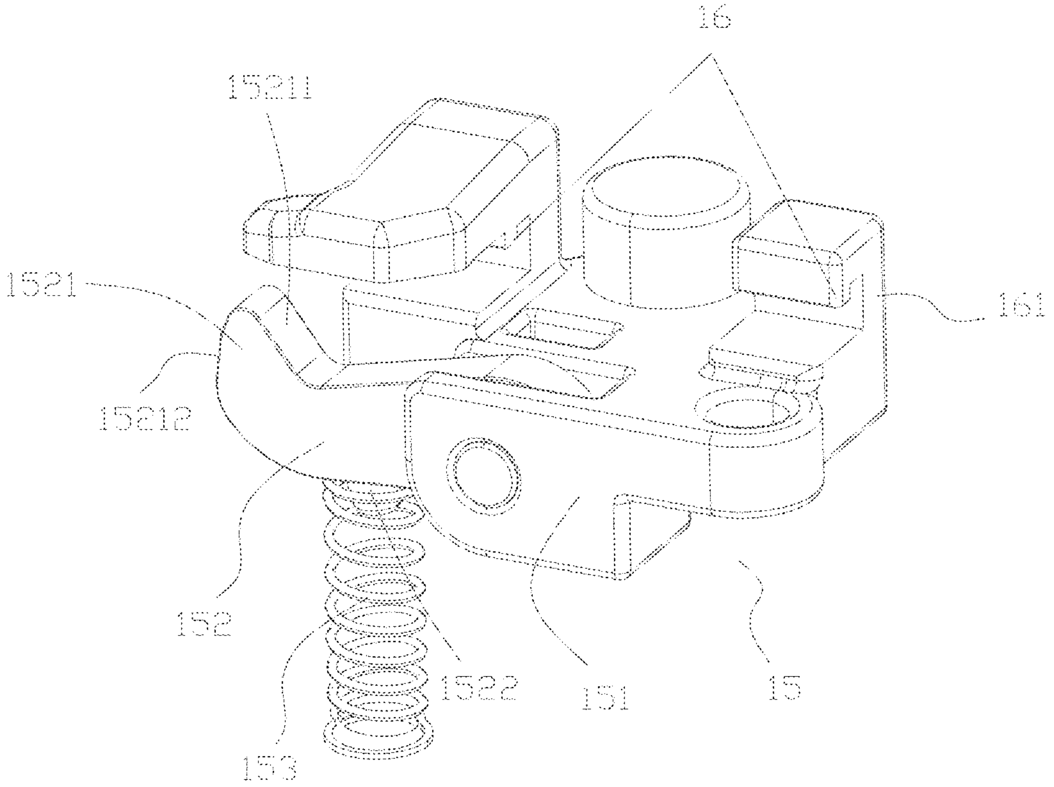
FIG. 7 shows a schematic perspective view of a relay device according to the present application.
Figure 8:
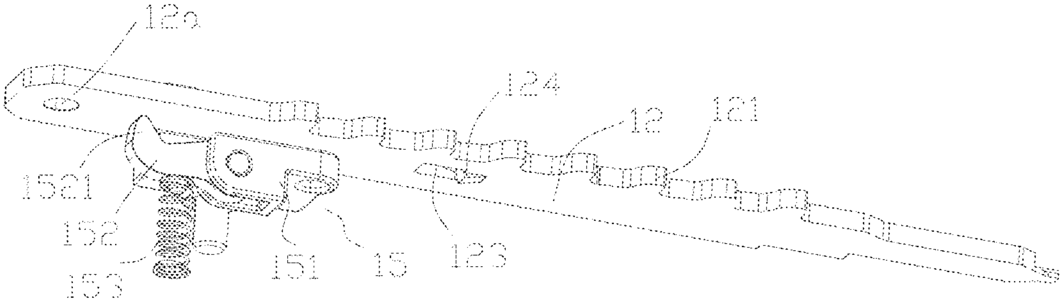
FIG. 8 shows a schematic perspective view of a relay device and a striker according to the present application.
Figure 9:
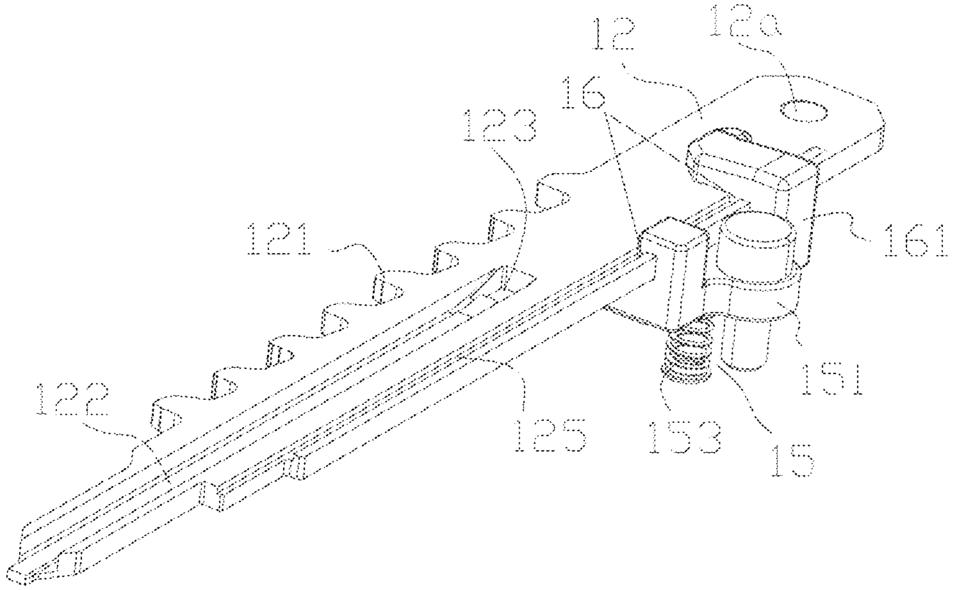
FIG. 9 shows a schematic perspective view of a relay device and a striker according to the present application taken from another view.

As shown in FIGS. 1-9, a striker driving mechanism 1 for an electric nail gun is provided in the middle part of a nail gun body 2. An energy accumulator mechanism 3 is provided at the top rear of the nail gun body 2, and a nail magazine mechanism 4 is provided at the front of the nail gun body 2.

The striker driving mechanism 1 mainly includes a striker 12, a driving motor 13, a driving cam 14 and a relay device 15.

The rear end of the striker 12 is provided with a connection hole 12*a*, which extends into the energy accumulator mechanism 3 of the nail gun and is hinged with a piston 31 of the energy accumulator mechanism. The energy accumulator mechanism 3 includes a cylinder 32 and a piston 31. The sealed space in the energy accumulator mechanism 3 is filled with inert gas with a certain pre-pressure. When the piston 31 is moved back, energy is accumulated by compressing the inert gas. Other energy accumulator structures can be used in the present application.

The front end of the striker 12 extends into the nail magazine mechanism 4 of the nail gun.

The driving motor 13 drives the driving cam 14 through a gearbox 131.

The driving cam 14 includes two eccentric wheels 14*a* having the same structure spaced apart from top to bottom. The circular center holes of the two eccentric wheels 14*a* are connected to the output shaft of the gearbox 131. The hollow part between the two eccentric wheels 14*a* is provided with a plurality of pins 14*b* spaced apart along the circumference. There are four pins 14*b* in the figures. Three or more pins may also be provided as desired.

The striker 12 has a single-sided tooth structure, with driving teeth 121 provided only on a side facing the driving cam 14. The driving teeth 121 mesh with a number of pins 14*b* of the driving cam 14 for transmission. Since the driving cam 14 needs to turn around twice during the entire course of backward movement for resetting of the striker 12, the number of the driving teeth 121 on the striker 12 is twice the number of pins 14*b* on the driving cam 14. In the figures, the number of driving teeth 121 is eight corresponding to four pins 14*b*.

The rotation of the driving cam 14 drives the striker 12 to move back to reset for the energy accumulation of the energy accumulator mechanism 3.

A nail driving groove 122 is centrally located on the top surface of the front part of the striker 12, extending from the front end to the middle part of the striker 12. A locking hole 123 through the top and bottom of the striker 12 is provided at the end of the nail driving groove 122.

A triangular projection 124 is provided on the bottom surface of the striker 12 and in front of the locking hole 123, wherein the slope of the front side 1241 of the triangular projection 124 is smaller than that of the rear side 1242 of the triangular projection 124.

The relay device 15 is provided between the striker driving mechanism and the energy accumulator mechanism 3, including a mounting base 151 which is fixed on the gun body 2 by means of screws. The mounting base 151 is provided with a striker support block 152 at the position directly opposite the central axis of the striker 12. One end of the striker support block 152 is hinged with the mounting base 151, with the other end, which is a free end, having an arc-shaped latch projection 1521 facing upward. A reset spring 153 is provided at the bottom of the arc-shaped latch projection 1521. The reset spring 153 is pre-compressed to enable the arc-shaped latch projection 1521 to maintain a tendency to pivot upward and to be held against the bottom of the striker 12. During the course of backward movement for resetting of the striker 12, when the driving cam 14 completes one rotation and the pin 14*b* thereon just separates from the driving teeth 121 of the striker, the arc-shaped latch projection 1521 just enters the locking hole 123 of the striker 12.

To facilitate the location and connection of the reset spring 153, the striker support block 152 is provided with a locating projection 1522 at the bottom of the free end.

The slope of the front side 15211 of the arc-shaped latch projection 1521 is less than the slope of the rear side 15212 of the arc-shaped latch projection 1521. This structure, combined with the structure that the slope of the front side 1241 of the triangular projection 124 is also less than the slope of the rear side 1242, prevent the striker 12 from moving forward when the arc-shaped latch projection 1521 enters the locking hole 123 with the rear side 15212 held against the rear side of the locking hole 123. When the striker 12 continues to move backward, the sliding between the apex edge of the triangular projection 124 and the gently sloping front side 15211 of the arc-shaped latch projection 1521 forces the arc-shaped latch projection 1521 to pivot reversely and quickly separate from the locking hole 123.

During operation, the arc-shaped latch projection 1521 on the striker support block 152 of the relay device 15 is always passively tightened against the bottom of the striker 12 by the reset force of the reset spring 153. During the nailing operation of the striker 12 from the maximum energy accumulation position to the termination position of nailing, due to the presence of the triangular projection 124 in front of the locking hole 123, the arc-shaped latch projection 1521 is first pressed down and crosses over the triangular projection 124, and then directly crosses over the locking hole 123 due to inertia, so as to ensure a smooth and rapid ejection of the striker 12 without obstruction. In the reset course of the striker 12 from the nailing termination position to the maximum energy accumulation position, when the driving cam 14 completes one rotation and the pin 14*b* of the driving cam 14 just separates from the driving teeth 121, the arc-shaped latch projection 1521 just enters into the locking hole 123 of the striker 12 to prevent the forward movement of the striker 12 to avoid the ejection of the striker 12 on the halfway of resetting. When the pin 14*b* of the driving cam 14 rotates to engage with the driving teeth 121 again, the striker 12 is driven to continue to move back, and the sliding between the apex edge of the triangular projection 124 and the gently sloping front side 15211 of the arc-shaped latch projection 1521 forces the arc-shaped latch projection 1521 to pivot reversely so as to quickly separate from the locking hole 123, to ensure that the striker 12 smoothly moves back for resetting. This course continues until the entire backward movement of the striker 12 for energy accumulation is completed. After the energy accumulation is completed, as the driving cam 14 continues to rotate, the pin 14*b* thereon immediately separates from the foremost driving tooth 121 of the striker 12. At this point, the striker 12 will quickly eject under the explosive force from the energy accumulation mechanism 3 and once again perform the nailing operation. Repeating the above processes can realize the continuous nailing operation of the electric nail gun.

The relay mechanism 15 consisted of the striker support block 152 and the reset spring 153 in the above structure is a passive relay device, wherein the arc-shaped latch projection 1521 is always appressed with the bottom of the striker 12 during the whole operation process of the striker 12, ensuring the smooth ejection of the striker 12 and the intermediate relay in the resetting course by coordination of the locking hole 123 and the triangular projection 124, which features simple structure and stable working performance.

It is noticed that the arc-shaped latch projection 1521 on the striker support block 152 is always held against the bottom of the striker 12, which causes uplifting of the striker 12 during the operation thereof. For this reason, a linear sliding groove 125 which is parallel to the nail driving groove 122 is provided in the middle part of the other side of the top surface of the striker 12 which is opposite to the driving teeth 121. Above the linear sliding groove 125 is provided with a striker middle part sliding guide block 16, along which the linear sliding groove 125 can slide. The guide block is fixed to the mounting seat 151 or the gun body 2 by a connecting arm 161. The above layout of the linear sliding groove 125 and the striker middle part sliding guide block 16 can restrict the gun striker 12 to always run on a certain operation plane, ensuring the alignment of the back-and-forth reciprocating motion of the striker 12, and thus enhancing the effectiveness and accuracy of nailing by the striker 12.

For the consideration of convenient assembly and simple processing, the nail magazine mechanism 4 consists of an upper shell 41, a lower shell 42, and a nail clip 43 configured to store and feed a nail. A nail channel 411 having guiding projections 412 on both sides is centrally located on bottom surface of the upper shell 41. The centerline of the energy accumulator mechanism 3, the centerline of the striker 12, and the nail channel 411 in the nail magazine mechanism 4 are coaxially aligned in a line. During operation, the nail driving groove 122 at the front part of the striker 12 slides back and forth along the guiding projections 412 on both sides of the nail channel 411 for nailing. A nail outlet 421 is provided in the middle part of the lower shell 42, running through the upper and lower surface thereof and connecting with the nail clip 43 located below the lower shell.

The start-stop operation of the driving motor 13 is controlled by a trigger 21 on the gun body 2 and a controller 22 inside the gun body 2. When the trigger 21 is pressed, the driving motor 13 starts to work. The stopping of the driving motor 13 is delay-controlled by the controller 22. The controller 22 can detect the working current of the driving motor 13 in real time, and compare the detected current signal of the driving motor 13 with a reference current value stored internally. Once the detected current signal exceeds the reference current value, the power supply of the driving motor 13 is immediately cut off, thereby stopping the driving motor.

Herein, the reference current value is taken to be slightly less than the value of the maximum current during the operation of the driving motor 13, because in practice the maximum current during the operation of the driving motor 13 generates when the striker 12 reaches the maximum energy accumulation position due to the largest load. Taking into account the actual operational needs, optimal working efficiency can be achieved only by stopping the motor immediately before the maximum energy accumulation position is reached. In this way, the nailing operation subsequent the next start will directly perform from the maximum accumulation position, which fundamentally eliminates the idle time between two nailing operations, thus improving operational efficiency.

The above descriptions are merely preferred embodiments of the present application, and should not be construed as any limitation on the present application. Any simple modifications, equivalent changes or modifications to the above embodiments based on the technical principles of the present application still fall within the scope of the technical solutions of the present application.

What is claimed is:

1. A striker driving mechanism for an electric nail gun, comprising a striker, a driving motor, a gearbox, a driving cam and a relay device; a rear end of the striker extending into an energy accumulator mechanism of the nail gun and being movably hinged with a piston in the energy accumulator mechanism to maintain linkage therebetween; a front end of the striker extending into a nail magazine mechanism of the nail gun; and the driving motor driving the driving cam to rotate through the gearbox; wherein:

the striker is provided with driving teeth only on a side facing the driving cam;

the driving teeth mesh with a number of pins on the driving cam;

a rotation of the driving cam drives the striker to move back to reset for energy accumulation;

a nail driving groove is located at a center of a top surface of the front end of the striker and extends from the front end to a middle part of the striker;

a locking hole running through the top surface of the striker and a bottom surface of the striker is provided at an end of the nail driving groove;

a triangular projection is provided on the bottom surface of the striker and in front of the locking hole; and the relay device is provided between the striker driving mechanism and the energy accumulator mechanism, wherein, the relay device comprises a mounting base, the mounting base is provided with a striker support block positioned directly opposite a central axis of the striker, one end of the striker support block is hinged with the mounting base and an other free end of the striker support block has an arc-shaped latch projection facing upward, a reset spring is provided at a bottom of the arc-shaped latch projection, the reset spring is pre-compressed to enable the arc-shaped latch projection to maintain a tendency to pivot towards an upward direction and to be held against a bottom of the striker, and during course of backward movement for resetting of the striker, when the driving cam completes one rotation and the pins thereon separates from the driving teeth, the arc-shaped latch projection enters the locking hole of the striker.

2. The striker driving mechanism for the electric nail gun according to claim 1, wherein a slope of a front side of the arc-shaped latch projection is less than that of a rear side of the arc-shaped latch projection, while a slope of a front side of the triangular projection is also less than that of a rear side of the triangular projection;

after the arc-shaped latch projection enters the locking hole, the rear side of the arc-shaped latch projection is held against a rear side of the locking hole to prevent a forward movement of the striker; and when the striker continues to move backward, a sliding between an apex edge of the triangular projection and a gently sloping front side of the arc-shaped latch projection forces the arc-shaped latch projection to pivot reversely and quickly separate from the locking hole.

3. The striker driving mechanism for the electric nail gun according to claim 1, wherein the top surface of the striker is provided with a linear sliding groove in middle part of an other side opposite to the driving teeth, and the linear sliding groove is parallel to the nail driving groove;

a striker middle part sliding guide block which is parallel to the nail driving groove of the striker is provided on the mounting base, and the striker middle part sliding guide block is fixed to the mounting base via a connecting arm; and the linear sliding groove of the striker slides back and forth along the striker middle part sliding guide block on the mounting base.

4. The striker driving mechanism for the electric nail gun according to claim 1, wherein the nail magazine mechanism comprises an upper shell, a lower shell, and a nail clip configured to store and feed a nail;

a nail channel having guiding projections on both sides is centrally located on a bottom surface of the upper shell;

a centerline of the energy accumulator mechanism, a centerline of the striker, and the nail channel in the nail magazine mechanism are coaxially aligned in a line; and a nail outlet is provided in a middle part of the lower shell, running through upper and lower surfaces thereof and connecting with the nail clip located below the lower shell.

5. The striker driving mechanism for the electric nail gun according to claim 4, wherein the nail driving groove at the front end of the striker slides back and forth along the guiding projections on both sides of the nail channel centered on the bottom surface of the upper shell of the nail magazine mechanism.

6. The striker driving mechanism for the electric nail gun according to claim 1, wherein a sealed space of the energy accumulator mechanism is filled with an inert gas with a certain pre-pressure.

7. The striker driving mechanism for the electric nail gun according to claim 1, wherein start-stop operation of the driving motor is controlled by a trigger on a gun body and a controller inside the gun body;

the driving motor starts to work when the trigger is pressed;

stopping of the driving motor is delay-controlled by the controller; and the controller detects a working current of the driving motor in real time and compares a detected current signal with a reference current value stored internally, and once the detected current signal exceeds the reference current value, a power supply of the driving motor is immediately cut off, thereby stopping the driving motor.

8. The striker driving mechanism for the electric nail gun according to claim 7, wherein the reference current value is less than a maximum current value during operation of the driving motor.

9. The striker driving mechanism for the electric nail gun according to claim 2, wherein the nail magazine mechanism comprises an upper shell, a lower shell, and a nail clip configured to store and feed a nail;

a nail channel having guiding projections on both sides is centrally located on a bottom surface of the upper shell;

a centerline of the energy accumulator mechanism, a centerline of the striker, and the nail channel in the nail magazine mechanism are coaxially aligned in a line; and a nail outlet is provided in a middle part of the lower shell, running through upper and lower surfaces thereof and connecting with the nail clip located below the lower shell.

10. The striker driving mechanism for the electric nail gun according to claim 9, wherein the nail driving groove at the front end of the striker slides back and forth along the guiding projections on both sides of the nail channel centered on the bottom surface of the upper shell of the nail magazine mechanism.

11. The striker driving mechanism for the electric nail gun according to claim 3, wherein the nail magazine mechanism comprises an upper shell, a lower shell, and a nail clip configured to store and feed a nail;

a nail channel having guiding projections on both sides is centrally located on a bottom surface of the upper shell;

a centerline of the energy accumulator mechanism, a centerline of the striker, and the nail channel in the nail magazine mechanism are coaxially aligned in a line; and a nail outlet is provided in a middle part of the lower shell, running through upper and lower surfaces thereof and connecting with the nail clip located below the lower shell.

12. The striker driving mechanism for the electric nail gun according to claim 11, wherein the nail driving groove at the front end of the striker slides back and forth along the guiding projections on both sides of the nail channel centered on the bottom surface of the upper shell of the nail magazine mechanism.

13. The striker driving mechanism for the electric nail gun according to claim 2, wherein a sealed space of the energy accumulator mechanism is filled with an inert gas with a certain pre-pressure.

14. The striker driving mechanism for the electric nail gun according to claim 3, wherein a sealed space of the energy accumulator mechanism is filled with an inert gas with a certain pre-pressure.

15. The striker driving mechanism for the electric nail gun according to claim 2, wherein start-stop operation of the driving motor is controlled by a trigger on a gun body and a controller inside the gun body;

the driving motor starts to work when the trigger is pressed; stopping of the driving motor is delay-controlled by the controller; and the controller detects a working current of the driving motor in real time and compares a detected current signal with a reference current value stored internally, and once the detected current signal exceeds the reference current value, a power supply of the driving motor is immediately cut off, thereby stopping the driving motor.

16. The striker driving mechanism for the electric nail gun according to claim 15, wherein the reference current value is less than a maximum current value during operation of the driving motor.

17. The striker driving mechanism for the electric nail gun according to claim 3, wherein start-stop operation of the driving motor is controlled by a trigger on a gun body and a controller inside the gun body;

the driving motor starts to work when the trigger is pressed; stopping of the driving motor is delay-controlled by the controller; and the controller detects a working current of the driving motor in real time and compares a detected current signal with a reference current value stored internally, and once the detected current signal exceeds the reference current value, a power supply of the driving motor is immediately cut off, thereby stopping the driving motor.

18. The striker driving mechanism for the electric nail gun according to claim 17, wherein the reference current value is less than a maximum current value during operation of the driving motor.

* * * * *